United States Patent [19]
Peynaud

[11] 3,800,274
[45] Mar. 26, 1974

[54] METHODS OF AND DEVICES FOR TRANSMITTING AND RECEIVING AS USED IN NAVIGATION SYSTEMS EMPLOYING THE DOPPLER EFFECT

[75] Inventor: Francois Peynaud, Paris, France
[73] Assignee: Thomson-CSF, Paris, France
[22] Filed: Dec. 26, 1972
[21] Appl. No.: 318,659

[30] Foreign Application Priority Data
Dec. 31, 1971 France .............................. 71.47765

[52] U.S. Cl. ...................... 340/3 R, 340/3 D, 343/8
[51] Int. Cl. .............................................. G01s 9/66
[58] Field of Search ......... 340/3 A, 3 R, 3 D; 343/8

[56] References Cited
UNITED STATES PATENTS
3,719,921  3/1973  Barret et al. ......................... 340/3 D Primary Examiner—Richard A. Farley
Attorney, Agent, or Firm—Cushman, Darby & Cushman

[57] ABSTRACT

The invention relates to an intermittent emission navigation Doppler system designed to determine the speed of a marine vessel by measurement of the Doppler frequency. The method and the device for implementing it, make it possible to maintain the amplitude of the received signals reflected by the submerged surface and the volumetric reverberation constant by utilising a pulse train radiated toward said surface with pulses amplitude decreasing as a function of time.

The invention is applicable primarily to navigation system using the Doppler effect.

8 Claims, 3 Drawing Figures

METHODS OF AND DEVICES FOR TRANSMITTING AND RECEIVING AS USED IN NAVIGATION SYSTEMS EMPLOYING THE DOPPLER EFFECT

The present invention relates to improvements in or relating to methods of and devices for transmitting and receiving as used in navigation systems employing the Doppler effect. It relates more particularly to an intermittent type ultrasonic waves emission navigation system designed to determine the speed of a marine vessel in relation to the submerged surface or sea bed.

In Doppler navigation systems an in particular those used in marine navigation, it is well-known that the measured relative speed of a vessel depends amongst other things upon the shift between an ultrasonic wave frequency emitted from the vessel and that of the wave which is received after diffusion back from the submerged surface.

Quite a number of such systems, utilises an ultrasonic waves continuous type emission thus allowing to derive permanently the speed information, the production and processing of this information being relatively simple in this case. However, a major drawback of these systems resides in the cross-modulation occuring between the transmit and receive beams as a result of water coupling and thus making the measurement erroneous. Another source of errors in measurement is the substantial "volumetric reverberation", i.e. the undesired reflection of the incident waves energy from microorganisms and gas bubbles which are distributed more or less uniformly throughout the water. Moreover the continuous type emission systems require substantial power.

In echo-sounding systems it is known, for example from French Patent No. 1 594 201, to overcome the problem of volumetric reverberation by utilising a transmitter producing short ultrasonic pulses, and a receiver with a time-controlled gain. However, the dynamic range of this time-controlled gain receiver must be wide, for example in the order of about 120 dB, and therefore presents problems in the receiver design. The utilisation of short pulses creates another problem, namely that of automatic and accurate detection of a water bottom echo in relation to the background noise and the parasitic echoes due to volumetric reverberation, this at all seabed depths. Thus, the greater the depth the larger the emitted energy must be in order that the echo level remains above the noise level. However, by increasing the emitted power, there is a corresponding increase in the extent of volumetric reverberation.

In certain Doppler navigation systems, such as disclosed for example in French Patent No. 2045218, a dead time is provided between the end of the transmitted pulse and the commencement of reception, making it possible to partially overcome the problem of crosstalk between transmission and reception beams, whilst utilising relatively long transmitted pulses. A major drawback of these systems is that their minimum depth range is relatively large so that they cannot for example be used as a berthing aid.

The present invention proposes an intermittent type emission Doppler navigation system which, in addition to the inherent advantages of intermittent emission systems, has the advantages of continuous type emission systems as well, namely the fact that there is no need to search for a ground echo and that a relatively long time is available in which to execute the measurement.

Another object of the present invention is to define a method and a system for implementing the said method, which will enable the received and volumetric reverberation levels to be maintained constant, thus avoiding the need to provide an amplifier with a time-controlled gain in the receiver circuits. Furthermore, an economy can be achieved as far as the means ultrasonic power produced by the transmitter is concerned.

In accordance with one aspect of the present invention, transmit - receive method for Doppler navigation system using an intermittent type ultrasonic waves emission radiated toward the submerged surface discrete areas to determine by Doppler frequency measurement the speed of a marine vessel in relation to said surface, comprises:

ultrasonic wave amplitude modulation for producing a train of pulses with time controlled pulse amplitude decay and a selectively determined pulse duration, amplified transmission of said pulses to a transmit acoustic antenna means for energizing its electroacoustic transducer means and radiate acoustic waves energy toward said surface with said pulses duration equal to $To = 2D_o/c$, where $D_o$ is the maximum depth distance range of the system and $c$ the velocity of sound propagation in water, reception by a receive acoustic antenna means of the reflected acoustic wave energy by said submerged surface and processing the reflected signals in the receiving circuit means to derive Doppler frequency during signal amplitude of a constant value and a measurement time equal to $T_2$ substantially shorter than the said pulse duration $T_o$ and later than same.

In accordance with another aspect of the invention, the transmit/receive device used to implement the method and comprising a transmit antenna radiating ultrasonic waves toward the submerged surface and a receive antenna of the reflected signal by this surface end comprising at least one electroacoustic transducer, as well as a Doppler frequency measuring device, and in which a transmitter unit comprises, between its primary ultrasonic wave signal source and its transmitting antenna, an intermittent amplitude modulating means which converts said signal into a train of pulses with amplitude level of each pulse decreasing as a function of time, and, connected to the terminals of said means, a control system defining the recurrence frequency and the duration of said pulses as a function of the operating distance range of the receiver units, each receiver unit comprising at least one selective amplifier having a bandwidth equal to that of the Doppler frequencies, followed by an automatic gain control amplifier, connected to said frequency measuring device.

Other features and advantages of the present invention will become apparent during the course of the ensuing description, given by way of an example with reference to the attached drawings in which.

In accordance with the invention, the length $T_o$ of the transmitted ultrasonic wave pulses is made equal to:

$$T_o = 2D_o/c \qquad (1)$$

$D_o$ being the maximum distance range of the system and $c$ the velocity of sound propagation through water. The measurement of the received signal is carried out during a time $T_2$ which is substantially short in comparison with the duration $T_o$, the start of this measurement being separated from the end of transmission, by a time $T_1$. As far as the emitted signal amplitude level is concerned, in accordance with an important feature of the invention, it is chosen to decrease as a function of time so that the received signal level is constant throughout the measurement time $T_2$.

Figure 1:
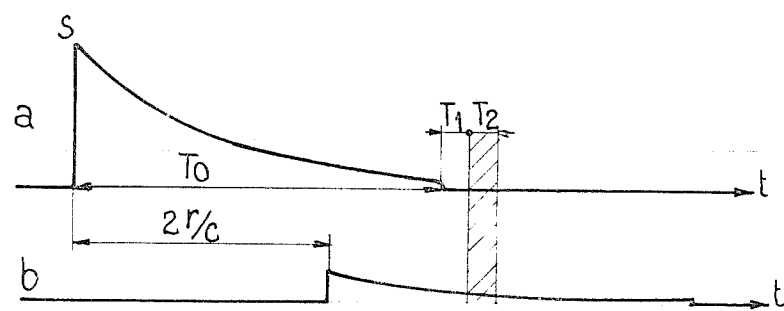
FIG. 1 is a diagram illustrating the shape and relative position in time of corresponding transmitted and received ultrasonic wave pulses produced in accordance with the present invention.

An emitted pulse $a$, as well as the corresponding received pulse $b$, are shown in FIG. 1, the value $r$ representing the distance between the transmit/receive antennae and the submerged surface.

The mathematical relation for the received signal level, measured in dB, is written in conventional manner as follows:

$$L = S - 2H(r) + R - f(D - r)$$

In this expression $S$ is the maximum emission signal level, $2H(r)$ is the propagation loss of the signal reflected from the underwater surface, at a range $r$, $R$ is the reflection factor, and $f(D - r)$ is the drop in acoustic energy level at the end of the distance $D-r$, where $D = c(T_o+T_1)/2$.

$H(r)$ is expressed in a manner known per se, as a function of the range $r$, a reference range $r_o = 1$ meter, and a propagation loss factor $\alpha_o$ in dB per meter:

$$H(r) = 20 \log (r/r_o) + \alpha_o r$$

As far as the reflection factor $R$ is concerned, it depends upon the reflection index $R_o$ of the ground (seabed, etc.) and upon the discrete area $A$ covered by the acoustic radiation which, for a conical lobe of apertural angle $\theta$ radians, may be written as:

$A = \pi\theta^2 r^2/4 = Kr^2$; thus, we have $R = R_o + 10 \log K + 20 \log r$.

For a submerged surface of given type, the relation $S + R_o + 10 \log K$ is equal to a constant quantity $K_1$, so that the received signal level can then be written as $$L = K_1 - [(20 \log r + 2\alpha_o r) + f(D - r)]$$

In order for this received energy level $L$ to remain constant, it is merely necessary therefore that the relation $f(D-r) + [20 \log r + 2\alpha_o r]$ is equal to a constant quantity $K2$. It can be shown that this condition is satisfied if the following approximation is made: $F(r) = 20 \log r + 2\alpha_o r$ †† $K_3 r$ and if a function $F(r)$ equal to $K_3 r$ is chosen. Then, we have:

$$K_2 = K_3 D - K_3 r + K_3 r = K_3 D$$

The graph plotting the function $$F(r) = 20 \log r + 2\alpha_o r \qquad (2)$$

can be split into several sections all virtually straight lines, this being equivalent to operation of the system in several distance ranges, each range having its own $K_3$ coefficient also expressed in dB/m.

Figure 2:
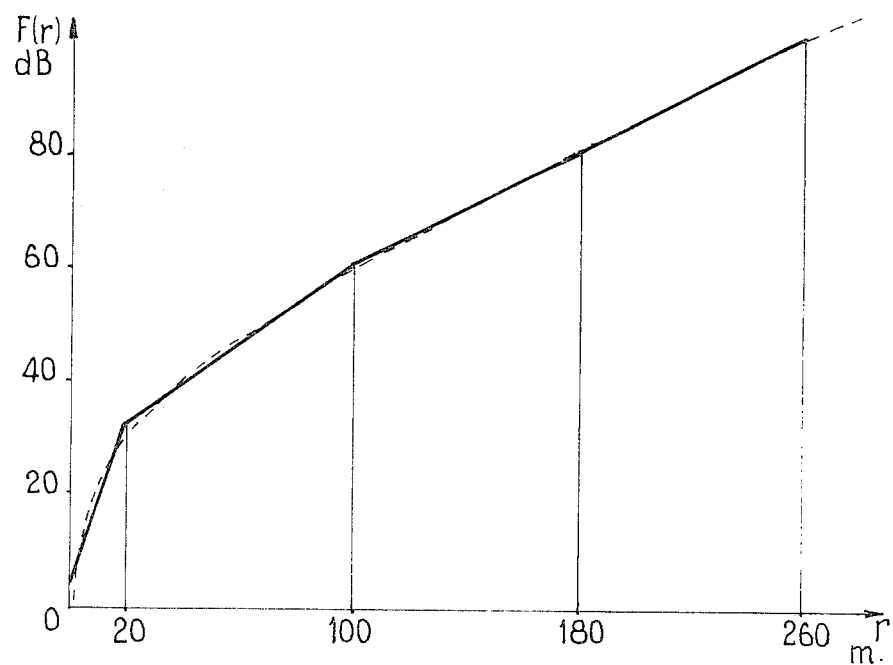
FIG. 2 is a graph in which are taken into consideration the length of the ultrasonic wave trajectory and the propagation loss factor as related by a selected function for which the received signal amplitude level remains constant when the submerged surface is of given nature, and which is taken into account in the method of the invention.

FIG. 2 illustrates this kind of graph $F(r)$, corresponding to an ultrasonic wave frequency of 300 kHz, and to a propagation loss factor $\alpha_o = 0.1$ dB/m. This graph, on the ordinate axis, plots the value in dB and on the abscissae the ranges $r$ in meters; it is split into sections defining four operating distance ranges corresponding respectively to 1m to 20m, 20m to 100m, 100 m to 180 m and 180m to 260m, for which the error due to the approximation $F(r)$ †† $K_3 r$ is less than 5 dB.

The transmitted signal level, expressed in dB, is then equal to: $E = S - K_3 r = S - (c/2) K_3 t$, this corresponding to an exponential decrease as a function of time $t$. Thus, automatic compensation of the influence of propagation losses upon the received signal level is achieved, and this avoids the need to utilise amplifiers with time-controlled gain in the receiver circuits.

In addition, in a window of the reception period, the level of the parasitic signals due to volumetric reverberation is relatively low and virtually constant in view of the fact that the larger the area covered by the radiation, i.e. the farther the range from the transmitter, the lower the emitted level becomes. It is particularly in a zone close to the transmit/receive transducer or transducer array, that is to say in the operating range corresponding to measurement of the shortest distance ranges, that the volumetric reverberation presents the greatest nuisance. It can be shown by calculation that in the case of an ultrasonic wave emission in accordance with the process of the invention, the contrast $C$, that is to say the interval, in dB, between the level of a signal reflected by the ground or seabed, and that of a parasitic signal due to the volumetric reverberation, is virtually constant and equal to $C = R_o - R_1 + 10 \log D$, where $R_1$ is the volumetric reverberation index.

By way of example, if the most unfavourable conditions are considered, that is to say in the present instance the lowest ground reflection index $R_o$, $R_o = -24$ dB, and the highest volumetric reverberation index $R_1$, $R_1 = -72$ dB, then at a range of $r = 20$ m the contrast value is $C = -35$ dB. Under the same conditions, the contrast $C$ obtained by means of the conventional devices, is barely $-18$ dB.

The reflection index $R_o$ of the ground or seabed, depends upon the nature of the submerged surface, and the received signal level $L$ will not be perfectly constant, its dynamic variation being however less than 30 dB and being easily compensated by means of an amplifier with automatic gain control.

Figure 3:
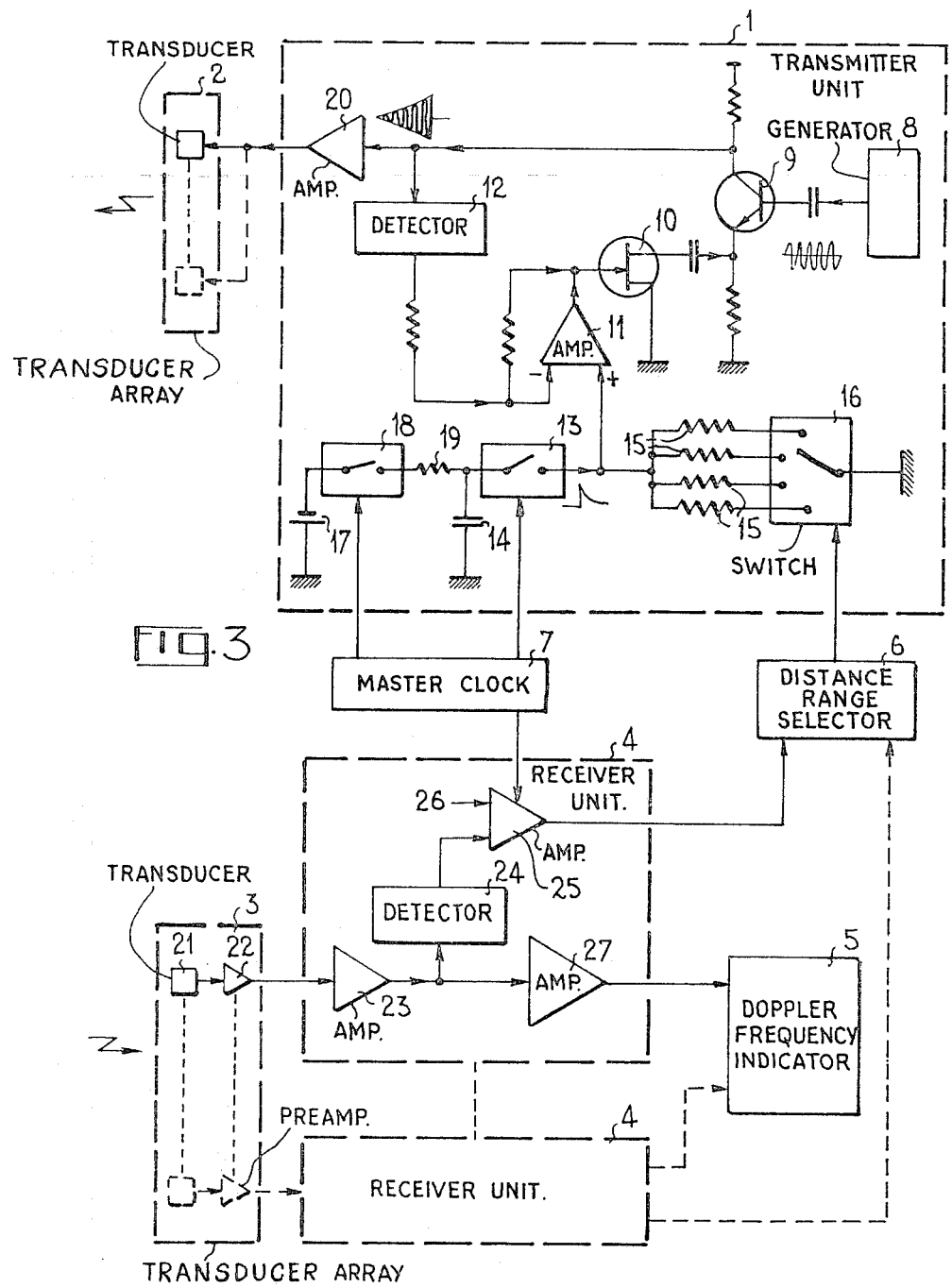
FIG. 3 is a block diagram of a transmit/receive system implementing the method of the invention which can be applied to Doppler sonar.

In FIG. 3, the block diagram of an embodiment of a transmit/receive system for Doppler sonar, in accordance with the invention, is shown.

In this system, the signal furnished by a transmitter-unit 1 is applied to a transmitting array 2, which, depending upon the case, may comprise a single electroacoustic transducer or several connected in parallel. This system moreover has as many receiver units 4 arranged in parallel, as there are electroacoustic transducers in a receiving array 3.

These receiver units 4 are connected on the one hand to the circuit 5 responsible for the Doppler frequency measurement and on the other hand to the distance range selector circuit 6. A master clock 7 supplies the transmitter 1 and the receivers 4 with sync. signals.

The transmitter unit 1 comprises, on the one hand, an amplification channel between the transmitter array 2 and the primary source 8 for producing an ultrasonic signal and comprising an amplitude modulating means, and, on the other hand, means for sequentially controlling said modulation in order to transform the signal into a train of pulses of decreasing level, whose lengths depend upon the operating distance range of the receiver unit 4.

Said source is a conventional signal generator 8 supplying continuously a constant-amplitude sinusoidal signal of predetermined frequency, coupled to the input of the amplification channel. This input is formed by a first amplifier 9 and is followed by a conventional power amplifier 20 whose output is connected to feed the transmitter acoustic array 2.

The first amplifier, is a gain controlled transistor 9 in a common emitter arrangement, its base electrode being supplied with the signal to be modulated and amplified. Between its emitter and collector electrodes, intermittent modulating means controlled by the signals coming from the master clock 7 and the distance range selector 6, are arranged.

These means comprise, connected in series with the collector of the transistor 9, a linear detection circuit 12 receiving the modulated signal. The detector output is connected to a first input ( − ) of an operational amplifier 11 whose output is connected to the gate electrode of a field-effect transistor 10, the latter's drain and source electrodes being connected to the terminals of the bias resistor of the emitter of the transistor 9. The transistor 10 is utilised as a variable resistor controlled by the output voltage from the operational amplifier 11, the latter being utilised as a comparator.

The second input ( + ) of the amplifier 11 is connected to the output terminal of an assembly which is described in the following and which, as a function of the sync. signals from the clock 7 and the signals from the selector 6, produces recurrent pulses whose level decreases exponentially as a function of the time. Each pulse, through the medium of the amplifier 11 and the variable resistor 10, acts upon the gain of the input amplifier 9 and consequently amplitude modulates the level of the sinusoidal signal, between its constant maximum amplitude and zero amplitude. Thus, in the amplification channel a pulses train is obtained in which the levels of the pulses decrease exponentially as a function of time, and which is radiated by the transmitting array 2.

The assembly supplying the recurrent pulse applied to the second input (+) of the amplifier 11, comprises, between its common output terminal and earth, and extending from the latter, on the one hand a direct voltage source 17 and, between two contact breakers 18 and 13, a series-resistor 19 connected to an earthed capacitor 14, and, on the other hand, a switch 16 controlled by the range selector circuit 6, and respective range corresponding resistors 15, connected by one end connection in parallel to the common output terminal coupled to the said second input.

The master clock 7 supplies the control signals which maintain the contact breakers 18 and 13 in opposite states, respectively closed and open or vice versa; the contact breaker 18 being closed, at the instant of signal reception, the capacitor 14 is charged by the source 17; the contact breaker 13 being closed at the instant of transmission, the capacitor 14 discharges through the selected one of the resistors 15, and thus with a predetermined time constant, creating during emission an exponential decrease in the recurrent pulse level at the common output terminal connected to the second output (+) of the amplifier 11.

As far as the receiver circuits 4 are concerned, because of the small dynamic range of the signals received by the transducers 21 of the receiving array 3, the transducers outputs may be connected to preamplifiers 22 and thus realise a coupling between the array transducers and the receivers at a maximum signal level without any risk of saturation. This signal amplitude level will for example be at least equal to 3 mV whereas in the conventional systems it is little more than 10 microvolts or so.

A selective amplifier 23 of narrow-band type is provided at the input of the receiver unit 4. The amplifier 23 bandwidth corresponds to the Doppler frequency band and its output is connected on the one hand to an automatic gain control amplifier 27 which compensates for the variations in the ground reflection index $R_o$ and thus applies a constant signal level to the Doppler frequency indicator 5, and, on the other hand, a linear detection circuit 24. An operational amplifier 25, used as a comparator, receives the output signal from said circuit 24, as well as a direct reference voltage 26 representing the threshold below which no reception is possible, thus avoiding erroneous measurements to be made. Said comparator 25 is furthermore supplied with the signal from the master clock 7, this signal corresponding to a read-out-window or gate for the received signal. The comparator 25 output is connected to the range selection circuit 6 which consists for example of a counter.

In the system illustrated in FIG. 3, the scanning of the distance range sections is carried out from the lowest to the highest, that is to say in the direction of increasing range. If, in the lowest range section, no signal is received in the read-out window defined by the master clock 7, the range selector circuit 6 will cause the system to shift to the second range section and so on, until a signal is received in one of the read-out windows. With each range section, there corresponds a separate read-out window. If, for a given range sector, a signal is received in the read-out window, the frequency measurement is carried out and the system is locked on this range sector. By way of example, for the range sectors defined in the diagram of FIG. 2, the duration of emission will be 30 ms in the case of lowest range sector, and 100 ms in the case of the three other range sectors, the time $T_2$ of the read-out window being some few milliseconds. The recurrence frequency of the ultrasonic signal pulses will either be fixed and equal to 2 Hz or be such that the mean emitted power is constant.

The system can also be operated manually for switching the distance range switch 16. In this case, the receiver unit 4 comprises only the amplifiers 23 and 27 as the distance range selector 6 is replaced by the operator.

Thus, a system has been described which, whilst having the advantages of continuous type emission, does not need such a high emitted power. By way of example, for the fourth distance range comprised between 180 and 260 meters, the mean emitted power is equal to only around 4 percent of the maximum power. This emitted power is still sufficient to achieve a signal-to-noise ratio of the order of 20dB.

Of course, the invention is not limited to the embodiment described and shown which was given solely by way of example.

What is claimed is:

1. A transmit-receive method for Doppler navigation system using an intermittent type ultrasonic waves emission radiated toward the submerged surface discrete areas to determine by Doppler frequency measurement the speed of a marine vessel in relation to said surface, the method comprising the steps of:

amplitude modulating said ultrasonic wave for producing a train of pulses with time controlled pulse amplitude decay and a selectively determined pulse duration, amplifying and applying said pulses to an acoustic projector means for energizing its electroacoustic transducer means to radiate acoustic waves energy toward said surface with said pulses duration equal to $T_o = 2D_o/c$, where $D_o$ is the maximum depth distance range of the system and c the velocity of sound propagation in water, receiving the acoustic wave energy reflected by said submerged surface by a receive acoustic transducer means, and processing the received reflected signals in a receiving circuit means to derive Doppler frequency measurements during signal amplitude of a constant value and a measurement duration of $T_2$ substantially shorter than the said pulse duration $T_o$, said measurement being carried out when said pulse duration $T_o$ is over.

2. A method as claimed in claim 1, wherein the decrease, as a function of time, in the amplitude level of an emitted pulse is made exponential and depends upon a constant quantity $K_3$, said quantity being chosen so that a function $F(r) = 20 \log r + 2 \alpha_o r$, where r is the distance between the transducer means and said submerged surface and $\alpha_o$ the propagation loss factor, is made equal to $K_3 r$.

3. A method as claimed in claim 2, when applied for system operation with low dynamic received reflected signals and a low, constant volumetric reverberation level and when a representative graph of said function $F(r)$ has been split into several near-linear range sections of different slopes $K_3$, said method further comprising the step of assigning a specific transmitted signal and a different duration receiving window to each said range section, and therefore to each of the values $K_3$, and thus defining system operation in several distance ranges the system operation being carried out by switching said ranges systematically from the shortest to the longest until a signal is obtained in the particular reception window concerned.

4. A transmit/receive device for Doppler navigation system and comprising transmitting and receiving transducer means each equipped with at least one electroacoustic transducer, and a Doppler frequency measuring device, and in which a transmitter unit (1) comprises, between its primary ultrasonic wave signal source (8) and its transmitting transducer means (2), an intermittent amplitude modulating means (9) transforming said signal into a train of pulses with amplitude level of each pulse decreasing as a function of time, and, connected to the terminals of said modulating means, a control assembly defining the recurrence frequency and the duration of said pulses as a function of the operating distance range of the receiver units (4), each receiver unit comprising at least one selective amplifier (23) having a bandwidth equal to that of the Doppler frequency bands, followed by an automatic gain control amplifier (27) connected to said Doppler frequency measuring device (5).

5. A device as claimed in claim 4, wherein said modulating means is an amplifier with a control gain, comprising a transistor (9) in a common emitter arrangement, coupled by its base to a generator (8) constituting said primary signal source and producing a constant amplitude sinusoidal signal; between the collector and emitter electrodes of said transistor (9) is connected said control assembly which comprises a linear detector (12) receiving the modulated signal and connected between said collector and a first input (−) of an operational amplifier (11) connected as a comparator, and a variable resistor circuit (10) connected to the output of said comparator (11) and coupled in parallel across the bias resistor of the said emitter electrode, and comprising furthermore, connected to a second input (+) of said comparator (11), a recurrent pulse generator circuit controlled by a master clock (7), the duration of said pulses depending upon a time constant which is determined by the selected receiver distance range.

6. A device as claimed in claim 5, wherein said variable resistance circuit is formed by a field-effect transistor (10) the gate electrode of which is connected to the output of said comparator (11) and whose drain and source electrodes are connected to the terminals of said bias resistor; and wherein said recurrent pulse generator circuit comprises an earthed capacitor (14), alternately connected under control of the clock signals (7), to a continuous current load source (17) during reception and, during transmission, to one of the resistors (15) defining the selected distance range, by a switch means (16).

7. A device as claimed in claim 4, wherein the electroacoustical transducer (21) of the receiving transducer means is connected to a preamplifier (22) connected in the receiver unit (4) to said selective amplifier (23) whose output is connected, furthermore, to a linear detector (24) with output connected to a first input of a comparator (25), the second input of which is connected to a reference voltage source (26) determining the operating theshold of the comparator under control of a clock (7), the comparator output being connected to an input of a distance range selector circuit (6) which controls the position of a distance range switch means (16) provided in said transmitter unit (1).

8. A device as claimed in claim 7, wherein said system comprises several receiver units (4) connected in parallel between the receiving means (3) with its several transducer (21) and associated preamplifiers (22), and, on the one hand, a Doppler frequency indicator (5), and on the other hand, said range selector circuit (6) automatically operated.

* * * * *